July 17, 1962 E. C. PROCTER 3,044,242
RECIPROCATING CUTTER MOUNTING
Filed May 11, 1960 2 Sheets-Sheet 1

INVENTOR
EDWARD C. PROCTER
Walter V. Wright
AGENT

July 17, 1962  E. C. PROCTER  3,044,242
RECIPROCATING CUTTER MOUNTING
Filed May 11, 1960  2 Sheets-Sheet 2
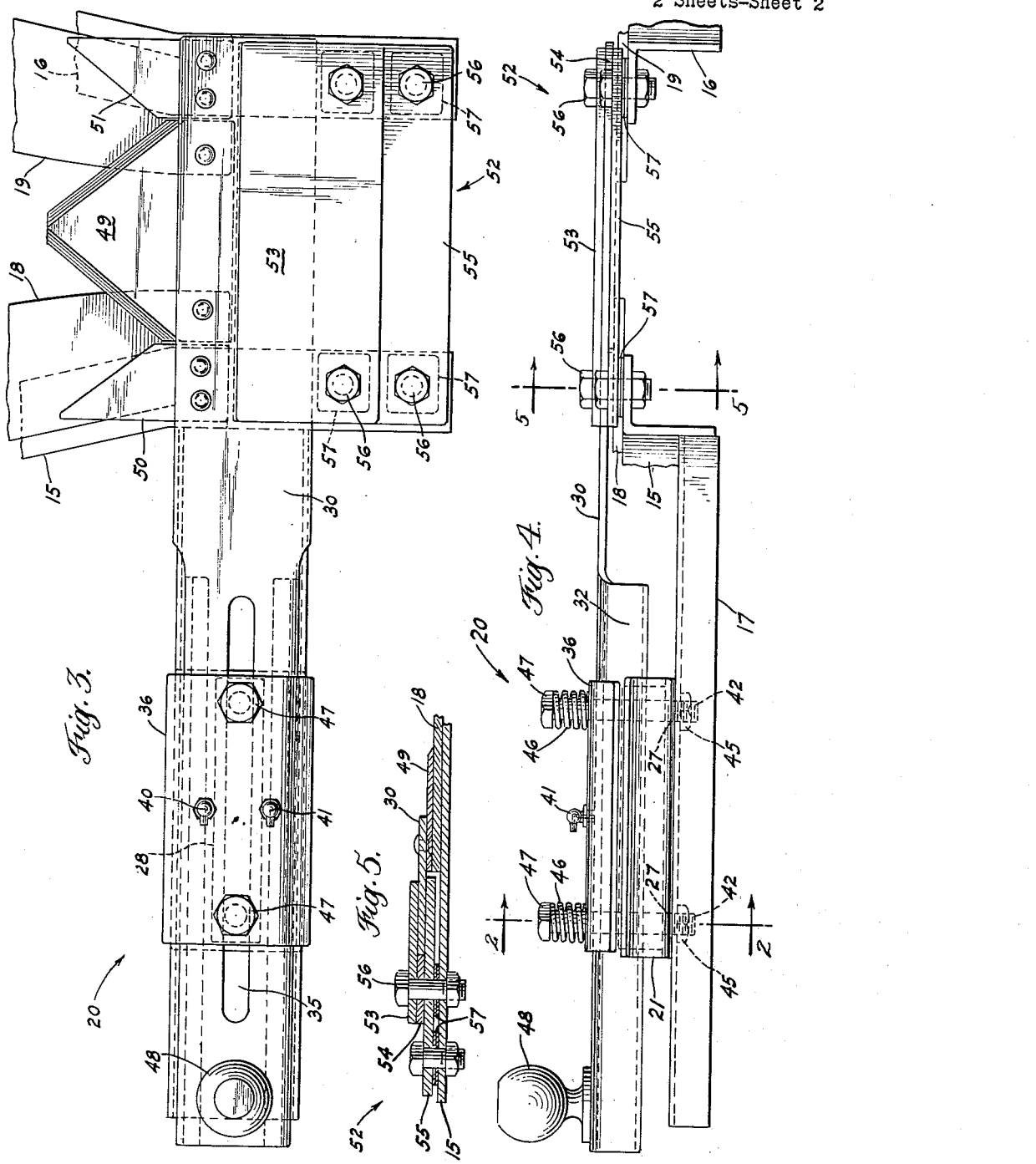
INVENTOR
EDWARD C. PROCTER
Walter V. Wright
AGENT United States Patent Office 3,044,242
Patented July 17, 1962

3,044,242
RECIPROCATING CUTTER MOUNTING
Edward C. Procter, New Holland, Pa., assignor to Sperry Rand Corporation, New Holland, Pa., a corporation of Delaware
Filed May 11, 1960, Ser. No. 28,315
11 Claims. (Cl. 56—304)

This invention relates to reciprocable cutters. Specifically, it is an improved mounting assembly for a reciprocable cutter.

In cutters of the above type, proper positioning of the movable cutter member relative to a stationary shear member is essential to proper cutting action. The maintenance of proper registry is difficult to achieve. Generally, the movable cutter is driven from one end in high speed, short stroke reciprocation, giving rise to considerable vibration which, along with the impact of the material being cut, tends to destroy the alignment of the cutter. Many relatively complicated, expensive mounting assemblies have been devised in an attempt to maintain this alignment. The bearing surfaces of reciprocable cutter mounts are subject to much wear as a result of the sliding contact between the cutter bar and its mount. These cutters are generally operated as close to the ground as possible, hence the mounting assemblies are subject to dust and dirt which tends to bind, or jam, the cutter bar in its mount as well as reduce the life of the bearing surfaces. Frequent lubrication and adjustment is required to insure proper operation of the cutters. Generally, shims are employed to accomplish the adjustment. Adjustment of the cutters involves at least partial disassembly of the mounting structure. The shims must be inserted or removed at one or both sides of the mount to regulate lateral alignment. This results in a trial and error type of adjustment. Moreover, the cutter must be re-assembled in order to determine whether proper alignment has been achieved. This is frequently a relatively difficult, time consuming task.

It is an object of this invention to provide a simple, inexpensive reciprocable cutter mount.

Another object of this invention is to provide a reciprocable cutter mechanism that is quickly and easily adjustable, even by an unskilled person.

Another object of this invention is to provide a reciprocable cutter mounting assembly having controlled flexibility to prevent binding.

Still another object of this invention is to provide a reciprocable cutter mounting assembly that will automatically compensate for normal wear without adjustment.

A further object of this invention is to provide a reciprocable cutter assembly wherein bearing surface wear will neither affect the alignment of the cutter bar nor effect a loosening of the cutter bar relative to its mount.

A further object of this invention is to provide a reciprocable cutter mounting assembly wherein all bearing surfaces may be lubricated from a single readily accessible location.

Other objects and advantages of the present invention will become apparent from the following description taken in conjunction with the accompanying drawings in which:

FIG. 3 is an enlarged fragmentary plan view of a reciprocable cutter constructed in accordance with the present invention.

FIG. 4 is a fragmentary rear elevational view of the mechanism of FIG. 3.

FIG. 5 is a cross sectional view taken on the line 5—5 of FIG. 4, looking in the direction of the arrows.

Figure 1:
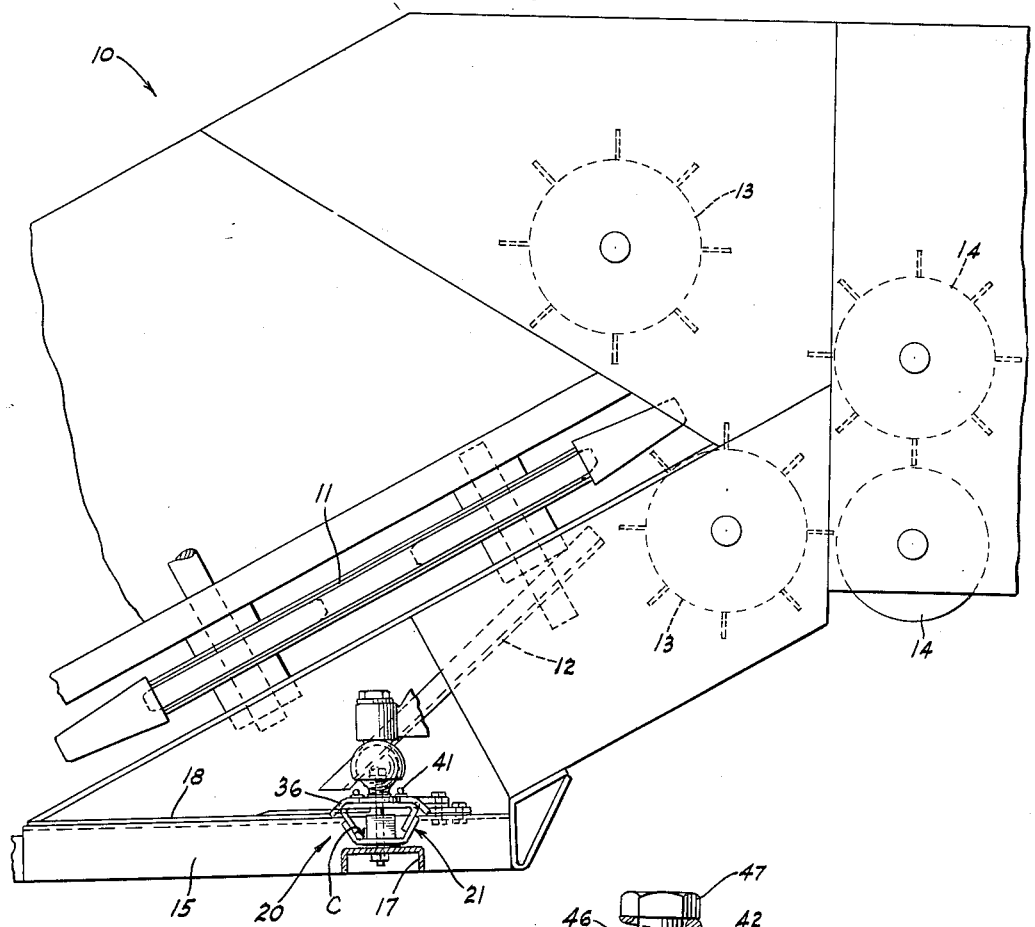
FIG. 1 is a fragmentary side elevational view of a portion of a row crop harvester illustrating an application of the present invention.

Referring to the drawings, the numeral 10 in FIG. 1 indicates, generally, a row crop header for a harvesting machine of the type shown in U.S. Patent 2,713,240. The header has conventional gathering chains 11, an upwardly and rearwardly inclined ramp 12, infeed rolls 13 and compression rolls 14. Header 10 carries frame, or support, members 15, 16 and 17 (see FIGS. 1, 3 and 4) which, respectively, carry fixed shear members 18 and 19 and the reciprocable cutter assembly 20 of the present invention. The cutter assembly 20 comprises a base, or channel, member 21. Base member 21 is formed to provide a channel C having a flat bottom 22 (FIG. 2) and inclined sides 23 and 24 diverging upwardly and outwardly from the bottom. The sides 23 and 24 provide first and second bearing surfaces 25 and 26, respectively. Base member 21 is provided with two longitudinally spaced threaded apertures 27 (see FIGS. 2 and 4). An elongate block 28 is welded, as at W in FIG. 2, or otherwise fixedly attached to the bottom 22 of base member 21. Block 28 is provided with apertures 29 (see FIG. 2) axially aligned with the threaded apertures 27 in base member 21.

Figure 2:
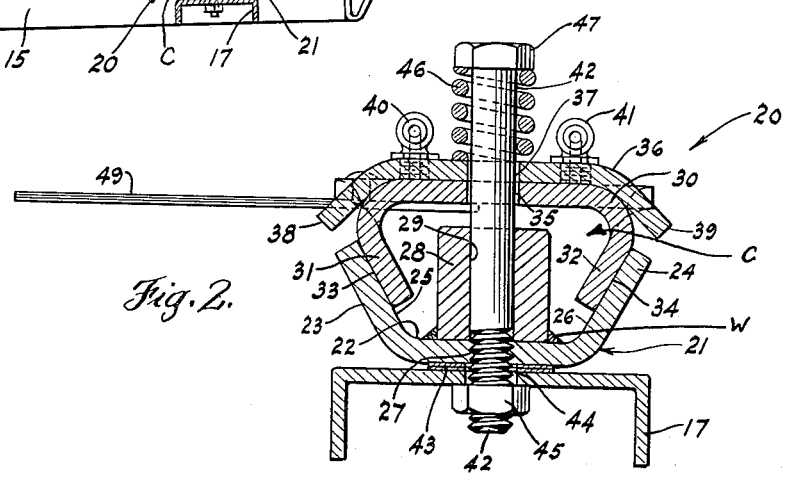
FIG. 2 is an enlarged cross sectional view taken on the line 2—2 of FIG. 4, looking in the direction of the arrows.

The numeral 30 indicates a sickle bar having, adjacent one end thereof, downwardly and inwardly inclined depending flanges 31 and 32. Flanges 31 and 32 provide downwardly converging bearing surfaces 33 and 34 which ride, respectively, on the bearing surfaces 25 and 26 of base member 21. A longitudinally extending elongate slot 35 is provided in bar 30 between flanges 31 and 32. As best seen in FIG. 2, slot 35 is in axial alignment with the apertures 29 in block 28 and threaded apertures 27 in base member 21 when flanges 31 and 32 are seated on the inclined bearing surfaces 25 and 26 of channel member 21.

An elongate plate 36 is seated on sickle bar 30 above base member 21. Plate 36 is provided with apertures 37, axially aligned with apertures 27 and 29 and slot 35. Plate 36 projects laterally beyond bar 30 and curves downwardly toward sides 23 and 24 of base member 21 as shown at 38 and 39 in FIG. 2. Grease fittings 40 and 41 are provided on plate 36.

Two bolts 42 extend through apertures 37 in plate 36, slot 35 in bar 30, apertures 29 in block 28 and are threaded through apertures 27 in base 21. The threaded end of each bolt 42 projects downwardly below base member 21 and extends through shims 43 and apertures 44 in frame member 17. Lock nuts 45 applied to the downwardly projecting threaded ends of bolts 42 serve to attach the mounting assembly to frame member 17. A coil spring 46 surrounds each bolt between its head 47 and plate 36.

At the end of bar 30 adjacent the mounting assembly, is mounted a ball 48 to which a pitman or other drive means, not a part of this invention, may be connected. The other end of bar 30 carries a knife 49 and cleaners 50 and 51. Upon reciprocation of bar 30, the knife 49 cooperates with fixed shear members 18 and 19 to sever material. The cleaners 50 and 51 ride on top of fixed shear members 18 and 19 scraping them clean upon each working stroke of bar 30.

Adjacent the end of sickle bar 30 which carries the knife 49, an adjustable guide 52 is provided (FIGS. 3 and 5). Guide 52 comprises top and bottom guide plates 53 and 55, respectively, separated by a spacer plate 54. These plates form a channel in which bar 30 is received (see FIG. 5). Four bolts 56 and four sets of spacer washers, or shims, 57 serve to attach adjustable guide 52 to frame members 15 and 16, which also, respectively, carry fixed shear members 18 and 19. Bar 30 is sufficiently flexible to permit the guide 52 and thus knife 49, to be adjusted relative to fixed shear members 18 and 19, independently of mounting assembly 20, simply by the addition or removal of washers 57.

In operation, bar 30 is reciprocated in a conventional manner, with its down turned flanges 31 and 32 riding on the inclined sides 25 and 26 of the channel in base member 21. As best seen in FIG. 2, bolts 42 threaded into base 21 serve to connect the plate 36 and bar 30 to base 21. Springs 46 urge the plate downwardly on bar 30 and, thus, urge flanges 31 and 32 into contact with the sides of the channel in base member 21. The inclined bearing surfaces of the bar and the base member, along with bolts 42 and springs 46, provide both lateral and vertical stability for bar 30. The block 28 prevents bolts 42 from failing at the stress concentration points where they are threaded into base 21. As the bearing surfaces 25, 26, 33 and 34 begin to wear, the springs will force the bar deeper into the channel. Since the bearing surfaces converge symmetrically toward the center line of the bar and channel, lateral stability will not be affected by bearing surface wear. The controlled flexibility of the mounting assembly resulting from springs 46 enables the assembly to yield in the event that a foreign object becomes wedged between two relatively movable parts. The tension of springs 46 may be regulated merely by loosening lock nuts 45 and turning bolts 42 in the threaded holes 27 in base member 21. When the desired tension is obtained, lock nuts 45 are tightened against frame member 17. Thus, it will be seen that the nuts 45 serve to both attach the assembly to frame 17 and maintain the proper tension on springs 46.

Lubricant injected between bar 30 and plate 36 via fittings 40 and 41 will travel laterally toward downturned portions 38 and 39 of plate 36, whereupon it will be directed downwardly over flanges 31 and 32 onto the bearing surfaces 25, 26, 33 and 34. Thus, all of the bearing surfaces may be lubricated from a readily accessible location on top of the mounting assembly.

The shims 43 between base member 21 and frame support 17 are employed, upon initial installation of the assembly on a harvesting machine, to provide proper initial registry of the cutting elements. Thereafter, if further vertical adjustment is necessary, the entire cutter mounting assembly 20 may be lifted from frame 17 without being disassembled, simply by removing lock nuts 45. Since normal wear will automatically be compensated for in the manner described above, it is unlikely that adjustment of shims 43 will be necessary.

All the members of the cutter bar assembly are of a simple configuration, easily formed from sheet stock and may be surface hardened after forming. Bar 30 may be hardened to a greater degree than plate 36 and base member 21 in order that these inexpensive, easily replaceable members receive the effects of wear instead of the cutter bar 30.

The above described mounting assembly, by automatically maintaining lateral alignment while automatically compensating for normal wear for extended periods of operation, requires relatively few adjustments. When adjustment is required, the operation consists merely of loosening nuts 45 and turning bolts 42. The resiliency of springs 46 provides sufficient latitude in the required adjustment operation to enable even an unskilled person to quickly make the adjustments. No disassembly of the structure or manipulation of shims is required. Lubrication of all bearing surfaces may be quickly accomplished from a single readily accessible location.

While this invention has been described in connection with a particular embodiment thereof, it will be understood that it is capable of further modification and this application is intended to cover any variations, uses or adaptations of the invention, following, in general, the principles of the invention and including such departures from the present disclosure as come within known or customary practice in the art to which the invention pertains and as fall within the scope of the invention or the limits of the appended claims.

Having thus described my invention, what I claim is:

1. A mounting assembly for a reciprocable cutter comprising a base member having first and second upwardly inclined planar bearing surfaces, an elongate bar mounted on said base member and having first and second downwardly inclined planar bearing surfaces slidably bearing, respectively, on said first and second base member bearing surfaces, a knife carried by said bar, means connecting said bar to said base member and resilient means carried by said connecting means and urging the bearing surfaces of said bar downwardly into engagement with the bearing surfaces of said base member.

2. A mounting assembly for a reciprocable cutter comprising a base member having an elongate channel formed therein, said channel having first and second planar sides and a bottom, the sides of said channel diverging outwardly from the bottom thereof, an elongate bar slidably mounted in said channel, said bar having first and second inwardly converging bearing surfaces slidably seated, respectively, on the diverging sides of said channel only, a knife carried by said bar, means connecting said bar to said base member and resilient means urging said bar into said channel whereby said bar may be moved in the direction of extent of said channel but not laterally relative thereto.

3. A mounting assembly for a reciprocable cutter as recited in claim 2 wherein a longitudinally extending slot is formed in said bar between said first and second bearing surfaces, said base member having a threaded aperture between the inclined sides of said channel in axial alignment with said slot, said connecting means comprises a bolt extending through said slot and said aligned aperture, and said resilient means comprises a spring carried by said bolt between one end thereof and said bar.

4. A mounting assembly for a reciprocable cutter as recited in claim 3 wherein a plate rests on said bar over said channel, said bolt extends through said plate and projects thereabove and said spring is carried by the portion of said bolt projecting above said plate and urges said plate toward said bar thereby urging said bar into said channel.

5. A mounting assembly for a reciprocable cutter as recited in claim 4 wherein said plate carries lubricant receiving means and portions of said plate project laterally beyond said bar and extend downwardly toward said bearing surfaces whereby lubricant injected between said plate and said bar through said receiving means will be directed onto said bearing surfaces by the downwardly extending portions of said plate.

6. A mounting assembly for a reciprocable cutter as recited in claim 3 wherein an apertured reinforcing member is fixedly mounted in the bottom of said channel and said bolt extends therethrough.

7. A mounting assembly for a reciprocable cutter as recited in claim 3 wherein a support carries said base member and means are provided for adjusting said base member relative to said support.

8. A mounting assembly for a reciprocable cutter comprising a base member having an elongate channel formed therein, said channel having a bottom and first and second planar sides diverging outwardly from said bottom, an elongate bar having first and second converging planar bearing surfaces thereon, said bar being disposed over said channel with said first and second bearing surfaces slidably seated respectively on the sides of said channel, a knife carried by said bar, a plate bearing on said bar over said channel, means connecting said plate and said base member and resilient means carried by said connecting means and urging said plate toward said base member whereby said bar may slide along the sides of said channel but cannot move out of said channel or laterally relative thereto.

9. A mounting assembly for a reciprocable cutter as recited in claim 8 wherein said plate projects laterally beyond said bar and bends downwardly there around whereby lubricant injected between said plate and said rod will be directed onto said bearing surface by the projecting portions of said plate.

10. A mounting assembly for a reciprocable cutter comprising a base member having first and second angularly disposed planar bearing surfaces thereon, an elongate bar mounted on said base member and having first and second angularly disposed planar bearing surfaces slidably engaging, respectively, said first and second base member bearing surfaces, a knife carried by said bar, means interconnecting said bar and said base member and resilient means urging the bearing surfaces of said bar into engagement with the bearing surfaces of said base member.

11. A mounting assembly for a reciprocable cutter comprising a base member having an elongate channel formed therein, said channel having sides and a bottom, the sides of said channel diverging outwardly from the bottom thereof, an elongate bar having first and second converging flanges depending therefrom, said flanges being slidably seated, respectively, on the sides of said channel, a knife carried by said bar, a plate bearing on said bar, means connecting said plate and said base member and resilient means urging said plate toward said base member and thereby urging said bar into engagement with said base member.

References Cited in the file of this patent

UNITED STATES PATENTS

| | | |
|---|---|---|
| 597,400 | Douglass | Jan. 18, 1898 |
| 1,083,072 | Ferbrache | Dec. 30, 1913 |
| 2,139,927 | Bane | Dec. 13, 1938 |

FOREIGN PATENTS

| | | |
|---|---|---|
| 1,164,910 | France | May 19, 1958 |
| 564,847 | Canada | Oct. 21, 1958 |